United States Patent Office 3,246,275
Patented Apr. 12, 1966

3,246,275
ELECTRIC RESISTANCE ELEMENTS OF SILICON CARBIDE AND METAL SILICIDE
Nils Gustav Schrewelius, Hallstahammar, Sweden, assignor to Aktiebolaget Kanthal, Hallstahammar, Sweden
No Drawing. Filed June 17, 1963, Ser. No. 288,555
Claims priority, application Sweden, June 18, 1962, 6,764/62
2 Claims. (Cl. 338—330)

The present invention relates to an electric resistance element having a central incandescent zone and terminal zones attached thereto and consisting of a skeleton of recrystallized silicon carbide particles the pores of said skeleton being filled out so that the porosity of the body is less than 5% by volume.

Since long ago silicon carbide, SiC, has been used as an oxidation proof heat resistant material and it has been used industrially in several fields, for instance, as electric resistance elements and fire-proof bricks. An inconvenience of such silicon carbide bodies has been their porosity which reduces the inherent ability of the silicon carbide to resist corrosion attacks, particularly at high temperatures. It is difficult to sinter bodies of silicon carbide and if the bodies are made in a ceramical way by adding binding means to a pulverulent mass of silicon carbide, shaping this to a body and burning and sintering it, the product obtained will have a considerable porosity which can vary between 40 and 50% by volume. The enlargement of the exposed surface of the body hereby obtained means in practice that the resistivity against oxidation of such bodies will be many times worse than in the conceivable case that the bodies had no porosity at all.

It has therefore been a desire to establish bodies of silicon carbide having a small porosity and then two principal ways have been followed. According to the one method very finely divided powder mixtures of silicon carbide have been sintered under high pressure at high temperatures and thereby poreless or nearly poreless bodies have been obtained. According to the second method one has started with a mixture of silicon carbide and carbonaceous material which are shaped and then sintered at very high temperatures in an atmosphere containing silicon. The shaped bodies remain substantially in their original shape and the carbonaceous additions react with silicon vapour under the formation of silicon carbide which fills out the pores. The transfer of the carbon into silicon carbide means approximately a doubling of its volume and it is possible by suitable adaptation of the carbon contents to establish that the bodies obtained consist substantially only of silicon carbide and have a very small porosity. As a rule about 5 to 10% by volume silicon remains, however.

The first of said methods results in products having good properties but the method of manufacture is exceedingly expensive because specially made graphite forms must be used and these can generally not be used more than once or a few times each. Elongated bodies or bodies having complicated dimensions can thus not be manufactured according to this method.

Applicant has earlier disclosed a method in his application Serial Number 64,833, filed October 25, 1960, to manufacture shaped bodies containing silicon carbide and metal silicide which method is based on an infiltration process. According thereto preliminary shaped bodies consisting substantially of silicon carbide and a binding means are placed in a furnace together with a pulverulent material, consisting of a metal alloy with a composition determined according to certain rules. After heating in a reducing atmosphere at temperatures above the melting point of the alloy the latter penetrates into the porous preliminary body of silicon carbide and fills its pores at the same time as the silicon carbide is recrystallized to a body having a high heat resistivity.

According to this method it has been found possible to produce shaped bodies of silicon carbide and metal silicide at low cost which meet very high requirements as regards mechanical strength and resistivity against corrosion even at very high temperatures.

The present invention has for its object to further develop the latter method whereby it has been possible to manufacture poreless shaped bodies consisting of silicon carbide and metal silicide and having different compositions in different parts of the body. Such bodies are of a considerable technical importance, for instance, as electric resistance elements in which it is desirable to have different resistivities in different portions of the element. An important application of the present invention has for its object to produce elongated electric resistance elements in which the high temperature portion or incandescent zone consists solely or nearly solely of silicon carbide having a low porosity whereas the terminal zones contain in addition metal silicide whereby the specific resistance becomes lower in these terminal zones which thus remain cool.

The method according to the present invention is characterized in that a finely divided homogeneous mass of one or more of the substances carbon, silicon carbide and carbonizable material is pressed to a shaped preliminary body which is exposed to oxidation or pyrolysis in such a manner that the content of carbon, at least in certain portions of the shaped body, is partially burned away or brought to escape in gaseous form leaving an intermediate product containing carbon and, as the case may be, silicon carbide and that then the carbon content is brought to different values in different portions of the body and so that the central portion of the intermediate product is infiltrated with silicon and the remaining portions with metal silicide rich in silicon, silicon being gradually combined with the carbon so that this becomes bound in the form of silicon carbide and forms or reinforces the skeleton of the body. In the infiltration process those portions of the shaped body in which the carbon content is lower will absorb a larger quantity of metal silicide whereas those portions which have a higher content of carbon will take up silicon and its carbon will be transformed into silicon carbide and these portions will consequently afford a higher content of silicon carbide and a lower content of metal silicide. It is also possible to adapt the carbon content in certain portions of the porous shaped body in such a way that the silicon carbide is formed in situ in these portions during the infiltration process just in such a quantity that the pores are entirely filled out. In this way such portions will consist solely of silicon carbide whereas the remaining portions of the body will contain silicon carbide in combination with pore filling metal silicide. The dimensions and shape of the body are not noticeably changed during the course of the manufacture. The infiltration is continued until the porosity both in the incandescent zone and in the terminal zones is less than 5% by volume.

The infiltration process itself in which bodies of silicon carbide are infiltrated with metal silicide has been described in detail in the above cited earlier patent application and will thus not be discussed here more thoroughly. The principle of this method of manufacture is that the shaped body of silicon carbide is brought into contact with or is packed into or placed adjacent to a pulverulent mass containing a preliminary metal silicide whereupon the whole combination, if desired enclosed in ordinary paper, is heated in a furnace in a nonoxidizing atmosphere at such a high temperature that the silicide powder melts. In the infiltration the content of silicon is generally reduced and the preliminary alloy powder should thus contain a higher content of silicon than the final heat resistant metal silicide which is to be a constituent of the final sintered body. As a portion of the final body should consist of solely silicon carbide such a portion is infiltrated locally with only silicon whereas other portions of the preliminary body are infiltrated in the ordinary way with metal silicide.

According to an important embodiment of the present invention the starting material for the manufacture of the shaped bodies consists of silicon carbide and a carbonaceous material which may consist of pure carbon or a material which is transferred into carbon when being heated. The silicon carbon may be finely divided, such as reduced to a particle size less than 325 mesh, i.e. less than about 43 microns, but can also be graded as to particle sizes and contain different particle size classes having particles up to a few millimeters size. It is also possible to use extremely finely divided silicon carbide, such as a particle size of less than 10 microns. The carbon added may be graphite, preferably in colloidal form, or soot, such as carbon black. In certain cases it may be desired to manufacture bodies haivng at least in some portion thereof a very high content of silicon carbide and it is then preferable to use not only carbon in free form but also a carbonizable material, such as plastics or other organic products, which at the same time may function as binding means for the shaped preliminary bodies.

It is important that the quantities of free carbon and organic material are proportioned in a suitable way. In silicidizing the free carbon its volume is doubled and too high contents of free carbon must not be provided in the preliminary material because then its pores would be jammed at the increase in volume which follows upon the transformation of the carbon to silicon carbide. The free carbon formed at the pyrolysis through coking, for instance, of plastic is, on the other hand, utterly finely divided and loose. Plastics may thus be used with advantage in larger quantities. If it is the question of manufacturing a final shaped body having a very high content of silicon carbide, such as 85% by volume or higher, it is suitable to combine a material containing free carbon with a material which may be carbonized during the process. Such a combination is, for instance, colloidal graphite and plastic, for instance a plastic based on furan.

The silicon carbide included in the preliminary material is to be found in unchanged shape in the final product. In the cavities separating the silicon carbide particles forming the skeleton in the preliminary body and in which graphite and/or carbonizable materials are included, there will be formed during the infiltration process, on the one hand, new silicon carbide in situ by silicidizing of the carbon and, on the other, metal silicide from the infiltration powder will penetrate into the body. The final product will thus be generally poreless and consist of original silicon carbide formed in situ and metal silicide.

The invention is now based on the observation that the final shaped body manufactured in the above manner may be oxidized locally so that the carbon is burned out entirely or partially while forming carbon monoxide or gasified in hydrolysis. When such a preliminary pretreated body is infiltrated the quantity of silicon carbide formed in situ will vary according as the cavities remaining in the pretreated body are filled out with metal silicide. In such a way the body may be manufactured which has a higher content of metal silicide in certain portions than in other portions.

The burning away of carbon may take place in different ways. One way which is suitable in the treatment of elongated objects, such as rods or tubes, consists therein that the one end of the tube or the like is introduced into a furnace and held there until a suitable quantity of carbon is burned away. It is also possible to introduce the object in its entirety in the furnace and, through suitably disposed cooling coils, to control that certain portions are held at such a low temperature that any burning away of carbon is prevented or minimized. The oxidation of amorphous carbon starts generally already at 400° C. but, if the carbon is in the shape of graphite, its burning begins only at about 800° C. At a temperature of 1000° C. the combustion is complete after a couple of hours. By using different kinds of carbon, such as graphite and carbonized plastics, it is possible to modify further the carbon content in the pretreated body. During the burning away it is also possible to control that a temperature gradient is obtained over a longer or shorter zone whereby the carbon content within this zone is changed gradually from a comparatively high value to a comparatively low value. Hereby the advantage is obtained that the content of silicide in the final product is not changed abruptly along the body but continually or gradually as desired. The invention is particularly useful in the manufacture of electric resistance elements. In elements as previously known it has been necessary to establish a difference in resistance between the incandescent zone and the terminal zones by providing the terminal zones with a larger cross section or by welding together a number of part rods with different compositions. According to the present invention this is dispensed with because a preliminary body having a uniform cross section will obtain, after being pretreated in air and subsequently infiltrated, different and desired contents of a metal silicide. It is thus possible to manufacture an electric resistance rod in which the central portion consists of solely poreless silicon carbide whereas the terminal leads contain, for instance, 65% by volume SiC and 35% by volume $MoSi_2$. The resistivity of the central portion is at 1500° C. 200 ohms mm.²/m. and in the terminal portions 15 ohms mm.²/m. The comparatively small resistivity of pure SiC has probably some connection with the fact that it is unavoidable that small quantities of free silicon appear in the central portion and reduce its resistivity. When the element obtained is passed by an electric current the terminal leads will remain cool because the heat developed therein is only a fraction of that developed in the central or incandescent zone portion.

The composition of the metal silicide may be varied within wide limits. Of particular importance is the infiltration with molybdenum silicide in such a way that the final product will contain the silicide $MoSi_2$ exactly or possibly $MoSi_2$ with a small surplus or a small deficit of silicon, such as of 1 to 2% by weight, i.e. 35 to 36 or 38 to 39% respectively of Si and the balance Mo. Such variations in the silicon content may be of value for modifying the properties of the silicide, particularly in respect of the durability of the element at corrosion attacks. Also other disilicides may be used, such as those of titanium. Further, metal silicides other than disilicides and in which the metal belongs to the transition elements, i.e. tantalum, vanadium, niobium, tungsten, chromium, titanium, zirconium and hafnium, are useful.

It is also possible to use other silicide forming substances, such as boron, whereby the metal silicide will consist entirely or partially of silicon borides, such as $SiB_4$ or $SiB_6$. Hereby bodies resistant to heat and corrosion are obtained.

The method to carry out the invention is illustrated in the following example relating to the manufacture of an electric resistance element having a uniform cross section but a higher resistivity in the central incandescent zone portion than in the terminal portions.

*Example*

Green silicide carbide of a specific weight of 3.2 grams/cm.³ of commercial quality was crushed so that all the material could pass through a sieve with a size of 325 mesh, i.e. corresponding to a particle size of about 43 microns. Of this crushed carbide 675 grams was mixed with 100 grams colloidal graphite, 220 grams liquid furan plastic having a viscosity of 900 centipoises and 35 grams of a cellulose ester binding means having the designation Modocoll (a registered trademark) in aqueous solution. The mixture was worked in a mixer and extruded to straight rods having an outer diameter of 12 millimeters. The rods were dried and became rigid and were then considered as preliminary bodies prepared for the infiltration process. The specific gravity was measured to be 2.12 grams per cm.$^3$ which means that the SiC particles took up 43% by volume of the body.

In the infiltration process the incandescent zone portion was surrounded with pure silicon powder having a particle size of less than 43 microns. For the remaining portions of the rods there was used a pulverulent mass containing molybdenum silicide rich in silicon. This mass consisted of 30% by weight finely ground silicon having a particle size of 43 microns and 70% by weight MoSi$_2$ with a particle size of 8 microns. The powdered mixture further contained 3% by weight colloidal graphite and such a quantity of Modocoll solution that the mixture could be extruded. Of this powder mixture tube pieces were extruded with an inner diameter of about 12 millimeters and a wall thickness of 4 millimeters. The graphite powder was added with an object to facilitate the process of removing adhering powder fragments from the infiltrated body.

The extruded and dried rods of silicon carbide, graphite and plastic had a length of 100 centimeters. Each extreme end of the body was introduced a distance of 25 centimeters in a furnace and were heated 30 minutes at 350° C. in air. Then the graphite powder and the plastic were burned partially. The central portion of the rod was not subjected to any oxidation and had the original composition. After this pretreatment tube pieces of the powder mixture containing molybdenum silicide rich in silicon were thrust forcibly on to the terminal portions of the rods and other tube pieces containing solely silicon powder were thrust on to the incandescent zone portions so that the entire length of each rod was covered. The whole combination was then packed into ordinary paper. The parcel obtained was then introduced into a graphite tube furnace and heated during half an hour to 2000° C. At this temperature the pulverulent alloy was melting and absorbed by the preliminary porous bodies of silicon carbide. The central portion of the shaped body contained then carbon from the colloidal graphite and from the plastic. Instantly the carbon will take up silicon from the pulverulent mixture and form silicon carbide in situ in the pores of the preliminary body. In the incandescent zone portion the pores are entirely filled by silicon carbide. In the terminal portions of a length of 25 centimeters the carbon content is considerably lower since a part of the carbon has been burnt off. The formation of silicon carbide will thus be of less importance and the content of molybdenum silicide in the final body will be higher. After the remainders of the infiltration powder has been wiped off, which is quite easy, the final element is ready. It includes in its central incandescent zone solely SiC but in the terminal zones 65% by volume SiC and 35% by volume of a molybdenum silicide. From this one finds that about 57% by volume SiC is newly formed in situ in the incandescent zone and 25% by volume in the end portions. At 1500° C. the resistivity of the central portion is 140 ohms mm.$^2$/m. whereas the resistivity in the terminal zones is 15 ohms mm.$^2$/m. When the element operates as an electric heating element, the heat development will be many times higher in the incandescent zone than in the terminal zones and the latter will remain cool without providing any special cooling means. Due to the fact that the burning off of the graphite is not sharply delimited to the terminal zone but the degree of combustion varied continuously, for instance, over a length of a few centimeters there will be no abrupt transition between the different materials in the final product but the proportions of graphite content and molybdenum silicide content will vary continuously over this length whereby thermal tensions and other inconveniences in the final product are avoided. Resistance elements manufactured in this way may be used at temperatures up to 1700° C. but preferably not higher than 1550° C. The mechanical rupture strength of the material when subjected to bending stress is in the terminal portions 20 kilograms/mm.$^2$ and in the central portion 27 kilograms/mm.$^2$. The porosity is 4% by volume. The above electric resistance element had the shape of a straight rod. Instead tubes and many other shapes of resistance elements may be made, such as hairpin shapes, spirals, meanders and plates.

The method according to the present invention renders also possible the manufacture of bodies for quite other purposes than electric resistance elements. Such an application is for thermo-elements for very high temperatures, the one leg thereof containing a higher content of silicide or a silicide of another composition than the second leg. Another application is the use as heat resistant material generally in which one portion of the body, for instance its external surface, holds a higher content of silicon carbide than an interior portion. Alternatively, it is also possible to make bodies in which their outer portions contain a high content of metal silicide, whereas their inner portions consist substantially only of silicon carbide.

The contents of silicon carbide and silicide in bodies manufactured according to this invention may vary within wide limits. When mixing together pulverulent silicon carbide with different binding means one may adjust the composition in order to control the volumetric proportion of the silicon carbide so that, after the infiltration, said proportion will exceed 95% and even becomes close to 100% of the volume of the element. The balance, if any, will then consist of Si. On the other hand, any silicon carbide must not necessarily be included in the preliminary material which then instead contains carbon which, in the infiltration, is transferred to silicon carbide formed in situ. Generally, it is, however, desirable that the preliminary body to be infiltrated contains silicon carbide already from the beginning in such a quantity that the particles may make contact with one another, because in this way the best mechanical strength of the final product is obtained. In practical tests it has been found that the range of variations in this case will fall between 40 and 80% by volume silicon carbide. After the infiltration and formation in situ of silicon carbide the total content of silicon carbide may be increased up to about 99% by volume. The lower limit for the volumetric proportion of silicon carbide in bodies according to this invention is about 30%. The porosity of the final bodies should not exceed 15% by volume and preferably not 10%. The best results are obtained if the porosity is below 4% by volume. In certain cases it is even possible and desirable to reduce the porosity to a value less than 1% by volume. It may be suitable to make an after-treatment consisting in a carbonization of the infiltrated alloy. The carbonization takes place preferably in carbon monoxide at a temperature of 1800 to 2200° C., silicon carbide being then formed by silicon in the alloy. Especially, when the alloy consists of MoSi$_2$+Si the surplus of Si may be eliminated whereby the electric resistivity is increased.

I claim:

1. Electric resistance element having a central zone adapted to become incandescent when connected to a source of electrical power and terminal zones connected thereto, said zones consisting of a recrystallized skeleton of silicon carbide particles the pores of said skeleton being filled out so that the porosity of the element is less than 5% by volume, characterized in that the pore filling of said central zone portion of the skeleton consists essentially of silicon carbide formed in situ whereas in the terminal zone the filling consists essentially of material of the group consisting of molybdenum disilicide and mixtures of silicon carbide and molybdenum disilicide.

2. Element according to claim 1, characterized in that the said central zone portion consists of 95 to 100% by volume SiC whereas both terminal zones have the composition 40 to 75% by volume SiC and 25% to 60% by volume $MoSi_2$.

References Cited by the Examiner

UNITED STATES PATENTS

| | | | |
|---|---|---|---|
| 1,978,323 | 10/1934 | Power | 29—155.69 |
| 2,001,297 | 5/1935 | Boyles | 338—330 |
| 2,513,421 | 7/1950 | Meoni | 29—155.69 |
| 2,735,881 | 2/1956 | Mann | 338—330 X |
| 2,848,568 | 8/1958 | Wainer | 338—330 |
| 2,992,959 | 7/1961 | Schrewelius | 338—330 X |
| 3,051,924 | 8/1962 | Amberg et al. | 338—330 |
| 3,094,679 | 6/1963 | O'Connor et al. | 338—330 |

FOREIGN PATENTS 1,157,720  11/1963  Germany.

RICHARD M. WOOD, *Primary Examiner.*